United States Patent
Donges et al.

(10) Patent No.: US 8,186,181 B2
(45) Date of Patent: May 29, 2012

(54) MATERIAL APPLICATION APPARATUS AND METHODS

(75) Inventors: William E. Donges, Wellington, OH (US); Vincent Prieto, Lorain, OH (US); Jeffrey J. Kruke, Lorain, OH (US); Randy R. Fidler, Double Oak, TX (US); Timothy E. Wilson, Wakeman, OH (US); Justin E. Hall, Avon, OH (US); Jeffrey A. Wasko, Brunswick, OH (US)

(73) Assignee: Nordson Corporation, Westlake, OH (US)

(*) Notice: Subject to any disclaimer, the term of this patent is extended or adjusted under 35 U.S.C. 154(b) by 74 days.

(21) Appl. No.: 12/729,528

(22) Filed: Mar. 23, 2010

(65) Prior Publication Data

US 2010/0175617 A1 Jul. 15, 2010

Related U.S. Application Data

(62) Division of application No. 11/845,326, filed on Aug. 27, 2007, now abandoned.

(51) Int. Cl.
C03B 40/027 (2006.01)
C03B 40/02 (2006.01)

(52) U.S. Cl. ............................... 65/170; 65/26

(58) Field of Classification Search ............... 65/26, 170
See application file for complete search history.

(56) References Cited

U.S. PATENT DOCUMENTS

| | | | |
|---|---|---|---|
| 2,246,463 A | 6/1941 | Garratt | |
| 3,523,016 A | 8/1970 | Mattos | |
| 3,623,856 A | 11/1971 | Keller | |
| 4,409,010 A | 10/1983 | Brown | |
| 4,409,014 A * | 10/1983 | Taylor et al. | 65/170 |
| 4,579,574 A | 4/1986 | Sugie et al. | |
| 4,613,528 A | 9/1986 | Mueller | |
| 4,853,022 A | 8/1989 | Renki et al. | |
| 4,990,171 A | 2/1991 | Kojima et al. | |

FOREIGN PATENT DOCUMENTS

| | | |
|---|---|---|
| FR | 2570364 | 3/1986 |
| JP | 58-204829 | 5/1982 |
| JP | 62-003027 | 1/1987 |
| JP | 10-087335 | 4/1998 |

OTHER PUBLICATIONS

International Search Report from Application No. PCT/US08/072600 dated Nov. 13, 2008.

* cited by examiner

*Primary Examiner* — Matthew Daniels
*Assistant Examiner* — Cynthia Szewczyk
(74) *Attorney, Agent, or Firm* — Calfee, Halter & Griswold LLP

(57) ABSTRACT

Apparatus for spraying glass bottle mold bodies, such as blanks and rings in a molding machine, includes nozzles and spray guns mounted on a plate such that the nozzles are positioned to spray the mold bodies with a material such as a lubricant during normal operation of the machine and without shutting the machine down. The apparatus can be installed on an existing machine without changing the molding machine. Rings may be sprayed while in motion during normal machine operation. A nozzle is provided along with check valves to produce a tight conical spray pattern.

19 Claims, 6 Drawing Sheets

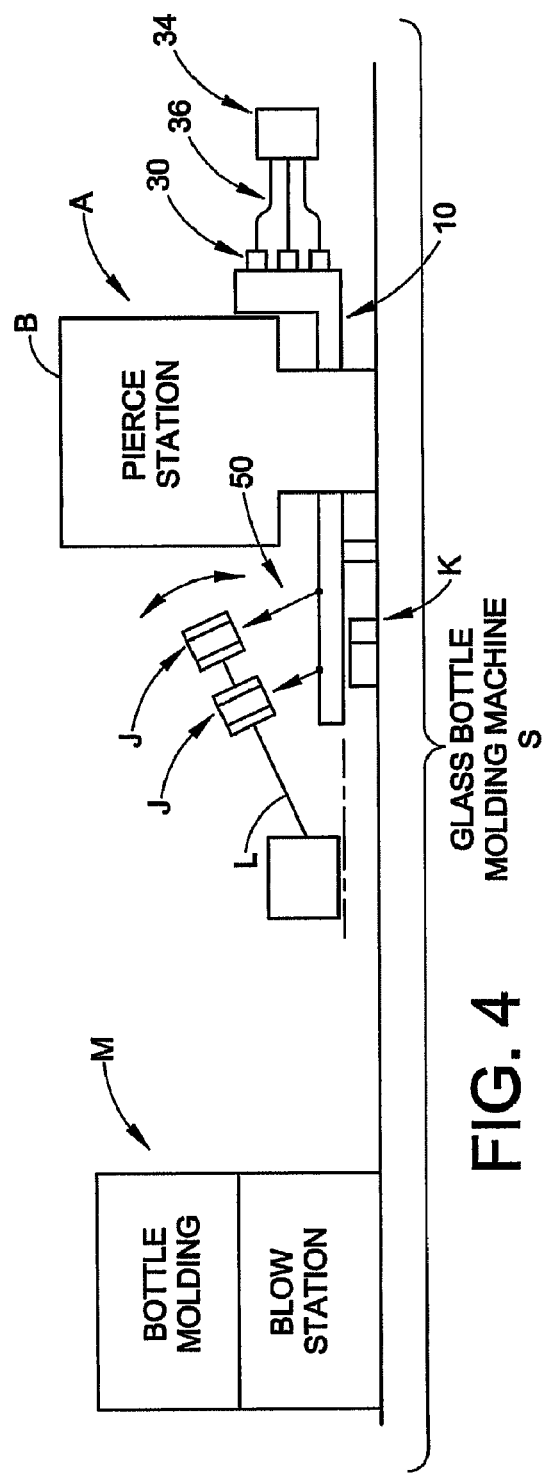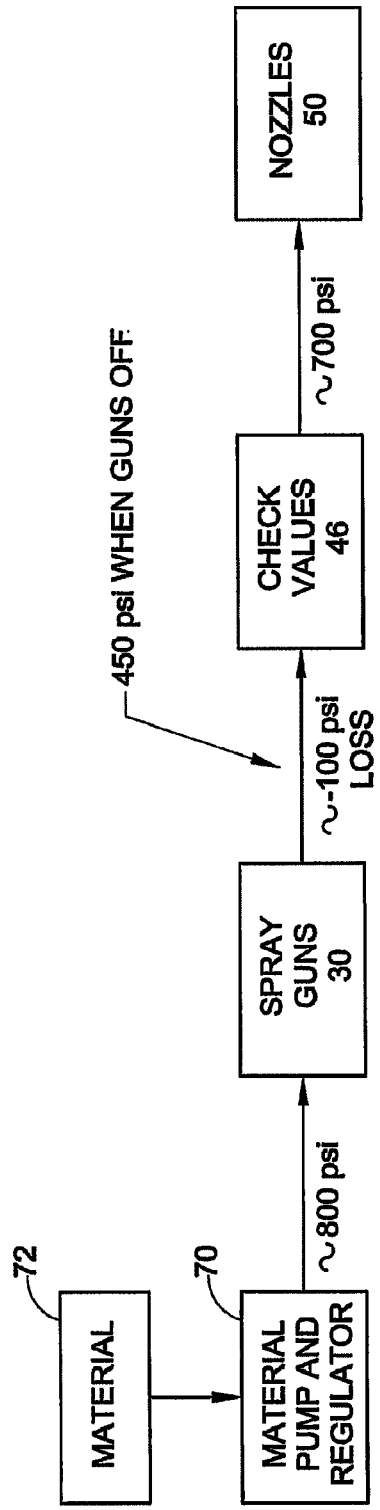

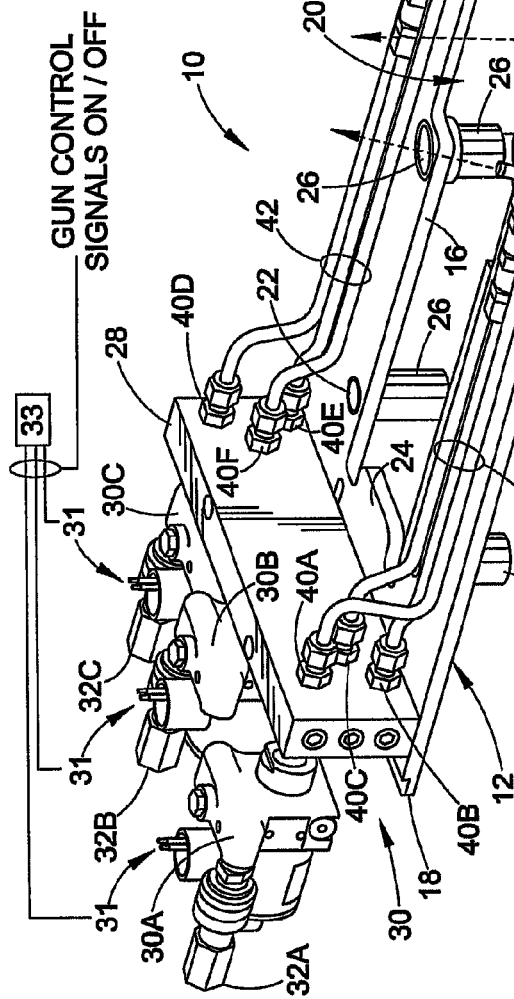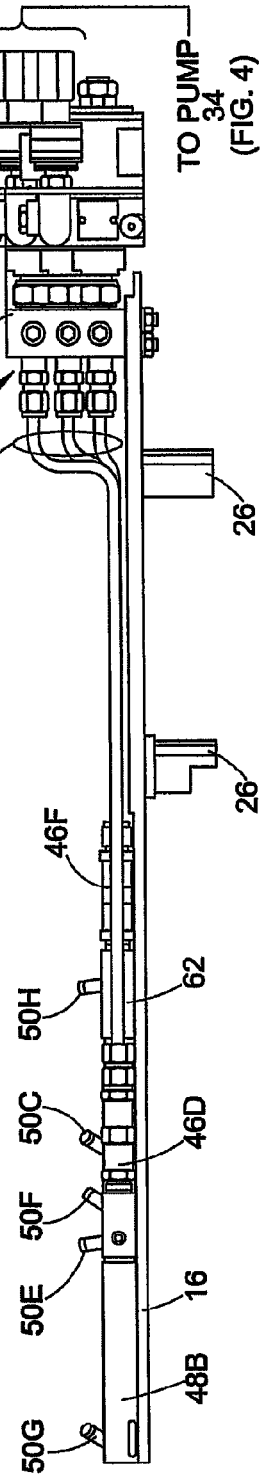

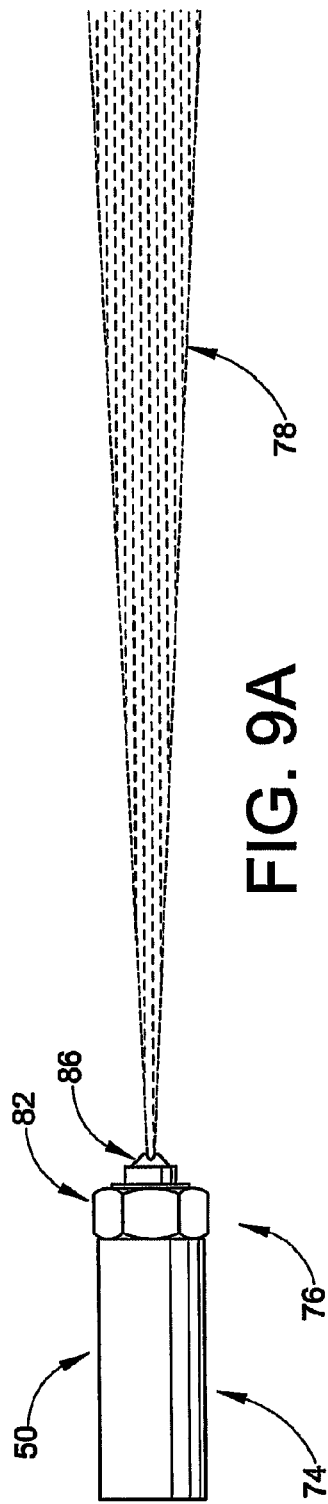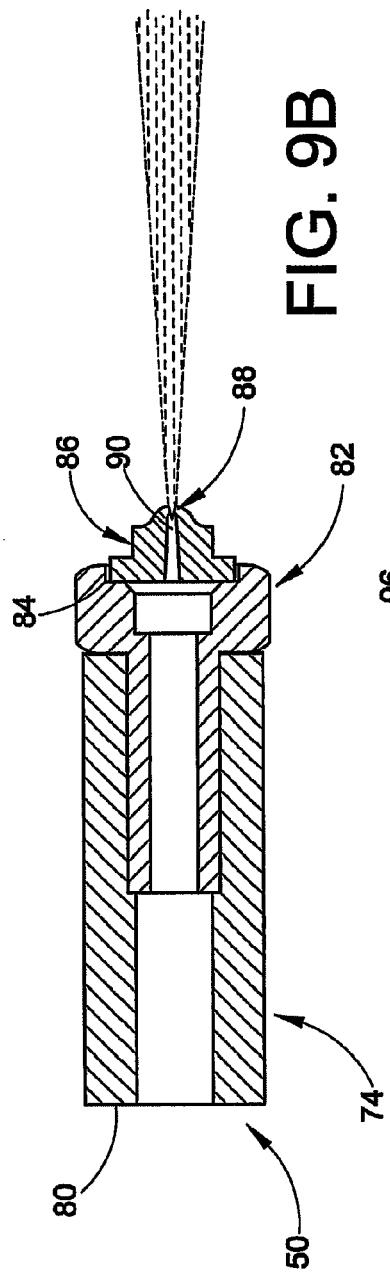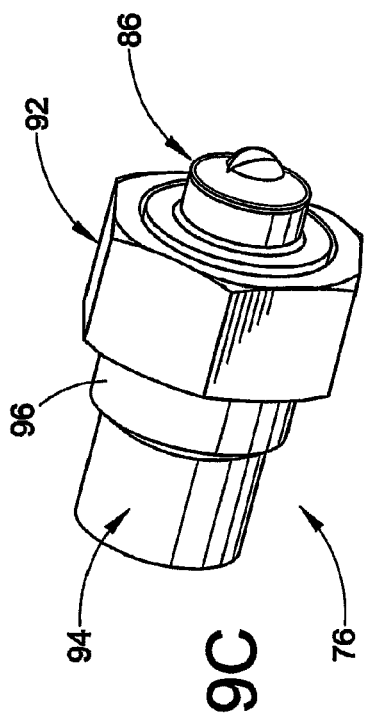

MATERIAL APPLICATION APPARATUS AND METHODS

TECHNICAL FIELD OF THE DISCLOSURE

The inventions relate to the art of applying material onto surfaces. More particularly, the inventions relate to application of material on surfaces such as, for example but not limited to, internal surfaces of molds used during glass molding operations.

BACKGROUND

Glass bottles are typically formed using a molding machine. In a common process known in the art as pierce and blow, at a first process station referred to herein as a parison forming station or a pierce station, a gob of molten glass is dropped into a mold through an opening or hole at the top of the mold, a baffle closes the hole through which the gob was dropped into the mold, and a pin pierces the gob to form a parison. The parison is transferred to a second process station referred to herein as a blow station where the bottle is blown into its final shape.

The molding machine typically includes a multi-piece mold body assembly. The mold body for a single bottle commonly includes two blank halves which together are used to shape the parison, and two ring halves which together are used to form a top of the bottle. A bottle top may be threaded or have another desired configuration. Before the gob is dropped into the mold, the two blank halves and two ring halves are fully assembled as a single mold body. In order to remove the bottle, the mold blank halves are swung apart and the mold ring halves are also separated. A lubricant material, which also may serve as a release agent, is periodically applied to the internal surfaces of the blanks and rings. Typically, an upper region of the blanks has the lubricant applied and the threads of the rings have lubricant applied. During a normal molding operation, the blanks are opened to a stationary position for a few seconds, but the rings are in motion between the pierce station and the blow station. A single complete pierce and blow cycle may typically last about four seconds.

All such molding apparatus for glass bottles require an operator to apply the lubricant material manually to the internal surfaces of the mold body, namely the rings and blanks. This is a human intensive effort in close proximity to molten glass, and is done with a brush. This effort is even more intense for machines that include two or more molds. For example, a two bottle mold machine has eight parison forming mold blank halves and four ring halves. Because the rings are normally in motion between the pierce and blow stations, the machine must be stopped in order to allow a few seconds for the operator to apply the lubricant. This down time necessarily equates into inefficiency and lost productivity Also, there can be significant inconsistencies between different operators as to the application of the lubricant under such extreme conditions, including the reliance on manual application. If too little or too much lubricant is applied, the result can be defective bottles resulting in scrap, particularly for the first few mold operations after the lubricant is applied.

SUMMARY OF THE INVENTIONS

The present disclosure presents a number of inventive aspects for both apparatus and methods relating to the application of a material, such as a lubricant for example, to interior surfaces of a mold body. A typical mold body in one embodiment for glass bottle manufacturing includes blanks and rings, but the present disclosure is not limited to molds per se or molds used for glass bottle manufacturing.

In accordance with one inventive aspect, apparatus is provided for applying material to interior or exposed surfaces, such as for example mold body surfaces, without manual application. In one embodiment, the material is sprayed onto the surfaces from a nozzle that receives pressurized material from a material application gun. In a specific embodiment, the gun may be electronically triggered on and off so that there is no operator involvement required.

The disclosure also contemplates methods embodied in the use of such apparatus. The disclosure further presents inventive methods including a method for applying material to an internal surface of a glass bottle mold, comprising the steps of pressurizing the material, and producing a spray of the material directed at the internal surface.

Further inventive aspects, advantages and benefits will become apparent to those skilled in the art after considering the following description in conjunction with the accompanying drawings.

BRIEF DESCRIPTION OF THE DRAWINGS

FIG. 4 is a simplified schematic of a glass molding machine including a pierce station and a blow station, in use with an embodiment of the invention;

FIG. 5 is an isometric of a first embodiment of a gun and nozzle assembly;

FIG. 5A is an elevation of the assembly of FIG. 5;

FIG. 7 is a simplified hydraulic schematic suitable for use with the apparatus of FIGS. 1-6;

FIGS. 9A-9C illustrate embodiments of a nozzle tip and tip holder assembly as used in the embodiments of FIGS. 1-8.

DETAILED DESCRIPTION OF EXEMPLARY EMBODIMENTS

Figure 1:
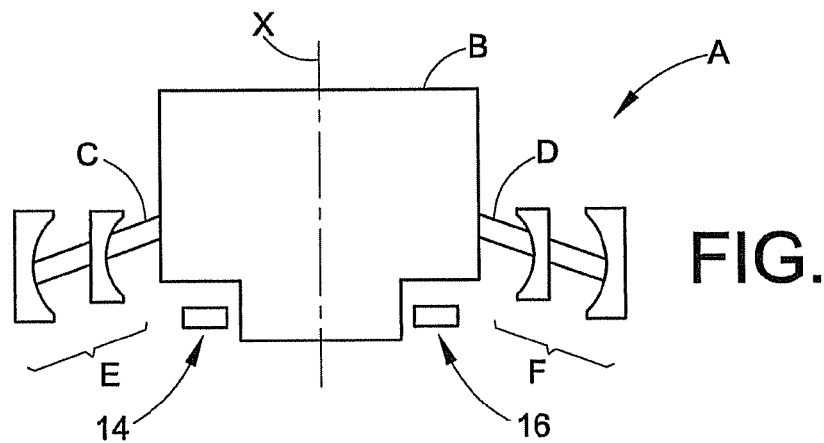
FIG. 1 is a front elevation, simplified schematic of a glass bottle molding machine pierce or parison forming station in use with an embodiment of the invention.

The inventions described herein are explained and illustrated in the context of glass bottle molding systems. However, many of the inventions herein will find utility and be applicable to different molding apparatus, and even outside the technological area of glass molding. For example, the inventions herein may be used to apply material to surfaces other than the internal surfaces of mold bodies. Additionally, the terms 'spray' and 'spray pattern' are intended to be understood in their broadest meaning to include not only those processes commonly referred to as 'spray' or 'spraying' but additionally any application technique involving the directing of a material across a space towards a target. The spray pattern may be abut need not be atomized. When used, atomization may be based on pressure, air, or both or other atomization techniques and combinations thereof. Still further, the terms 'spray' and 'spray patterns' are not to be limited to any particular time duration that the material is directed towards the target. In other words, very short bursts of material or narrow jets of material are still to be construed as falling within the understanding herein of the word 'spray' and 'spray pattern'. Although the exemplary embodiments herein utilize liquid material, the inventions herein may also find application with non-liquid materials such as powders or powder/liquid mixtures for example.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or foaming part of an invention, such identification is not intended to be exclusive, but rather there may be inventive aspects, concepts and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

Figure 2:
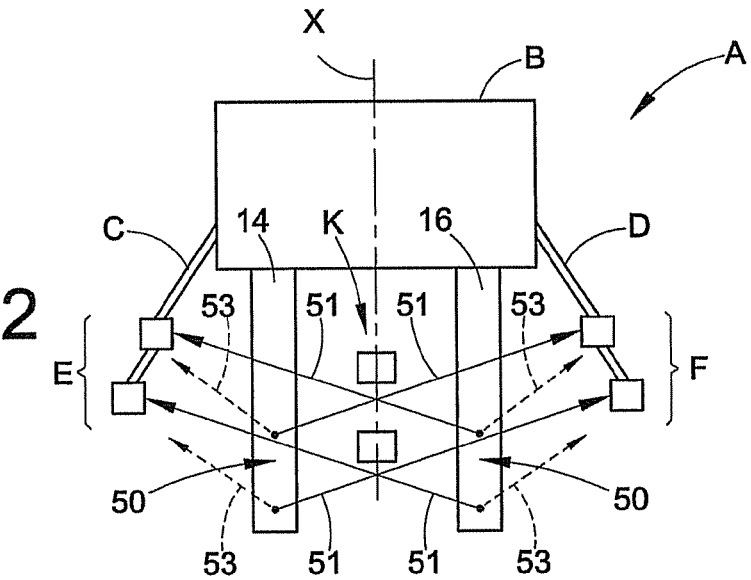
FIG. 2 is a plan view of the arrangement of FIG. 1.

With reference to FIGS. 1-4, an exemplary use of an embodiment of one or more of the present inventions is illustrated in a schematic manner. In this example, a pierce or parison forming station or section of a glass bottle molding machine S (FIG. 4) of a glass bottle production line is generally indicated with the reference letter A. The molding machine S also includes a blow station M the details of which, as well as the details of the parison forming station A, are well known and not pertinent to the present inventions. The parison forming station apparatus A includes a saddle B having first and second arms C and D. The saddle and arms support one or more pairs of blank halves E and F which are used to shape a parison to a desired configuration. In the illustrated example, there are two mold bodies used in the molding machine S to form two parisons, thus there are two pairs of blank halves and two pairs of ring halves. The parison shape facilitates the formation of the final glass bottle shape over at the blow station. The blank halves E and F are opened and closed during a molding operation. In a typical machine, the blank halves may be separated by about fifty-nine degrees, but other angles of separation may be used as needed when in the open position as illustrated in FIGS. 1 and 2. When the machine A closes the mold body, the blank halves are joined together at a centerline or axis X of the machine. Note that in FIG. 3 the blank halves are omitted for clarity and a pair of rings J are schematically illustrated as they move between the blow station and the parison forming station. In FIGS. 1 and 2, the rings are omitted and the blank halves are shown in a stationary position between molding operations.

Figure 3:
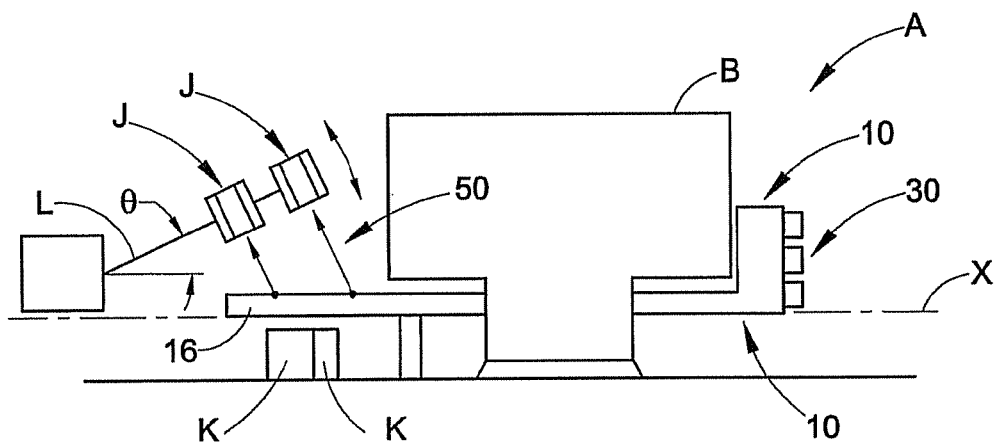
FIG. 3 is a side elevation of the arrangement of FIG. 1.

In addition to the blank halves E and F, a typical mold body for a glass bottle may include a pair of ring halves that when joined together form a ring J (FIG. 3). Thus, one pair of mating blank halves and one pair of mating ring halves form a parison mold body for a glass bottle that is blown to final form at the blow station M. Each ring J when assembled is used to form a cap end of the bottle.

For a normal molding operation, with the blanks open, a transfer arm L swings the rings J down into position on top of respective support blocks K. The blanks E and F (two mating pairs) are then closed around their respective ring J which is positioned at the lower end of the joined blanks, thus forming two mold bodies. A gob of molten glass is next dropped into each mold body and collects near the bottom of the mold at the ring J, and a respective baffle (not shown) covers the top of each mold. A pin (not shown) then rises from each support block K and pierces the gob to produce a parison. The blank halves E and F open and the transfer arm L swings the parisons, each still attached to their respective ring J, about 180° to a second process or blow station M (FIG. 4). Each parison is positioned inside a bottle mold and the gob is blown to than the final bottle shape. Each bottle cools sufficiently so that the bottle mold can be opened and the ring halves separated to fully release the bottle, but the hot bottle will retain its shape. The opened ring halves are re-closed and the transfer arm L then transfers the rings J back to the first or parison forming station A onto their respective support blocks K.

The molding process requires periodic application of a lubricant to the mold parts, specifically the internal threaded region of the ring and an upper region of the blanks, heretofore done manually with a brush. These target areas are specific to a glass bottle molding process, but the inventions herein may direct material application to any selected target surface depending on the particular machine and process they are used with.

In accordance with one inventive aspect of the present disclosure, a material application apparatus 10 is provided that may be used to automatically apply material to the parison mold body surfaces without manual application by an operator. The apparatus 10 in one basic embodiment includes one or more nozzles that direct a pattern of material at a targeted surface. High pressure material is supplied to the nozzles in relatively short bursts from one or more material application guns. A sufficient number of nozzles may be provided to apply material to the required surface areas. In the exemplary embodiment herein, two sets of rings and blanks or eight total target areas have material applied thereto, but the inventions may be used for as few as a single area of coverage or any other number of target areas. Thus in the exemplary embodiment, eight nozzles are provided.

The number of guns that are used to provide pressurized material to the nozzles will be determined in part by how much independent control is needed for each nozzle. In the exemplary embodiment, three guns are used. A first gun is used to supply four nozzles that direct material at the four stationary blank halves, a second gun is used to supply two nozzles that direct material at two of the moving ring halves and the third gun is used to supply material to two nozzles that direct material at the other two moving ring halves (keeping in mind that the rings when moving are each a single body comprising two joined rings halves). In different applications, greater or fewer than three guns may be used. For example, if a particular system only needs all nozzles to apply material at the same time, a single gun may be used. On the other hand, some applications may need each nozzle to be independently controlled so that there may be a gun for each nozzle, or some other way to independently control the on/off state of each nozzle.

In the illustrated embodiment, the glass molding machine and the parison forming station A in particular actually include two distinct parison mold bodies with each mold body comprising two blank halves and two ring halves, for a total of eight mold body parts that periodically need to have lubricant material applied thereto (FIG. 4 illustrates two rings J, for example). In a typical molding process, the lubricant needs to be applied about every twenty minutes or so depending on the run rate of the machine as well as other process parameters. Different material application intervals may be used however, with the present inventions. During each normal operating cycle of the machine A, the blanks E and F open to a stationary position for about two seconds or so, when the parison is released for transfer to the blow station. This stationary period thus provides an opportunity to spray material onto the blanks. The rings, however, are either in a state of motion or contain hot glass when not in motion, so that the rings can only have material sprayed on them as they return to the parison forming station before the next gob is dropped into the parison mold body. Accordingly, the rings must be sprayed while they are in motion, when transferring from the blow station to the parison forming station.

Since the two rings J travel different arcs from the blow station M to the parison forming station A, they may be sprayed at different times. Alternatively, as in the exemplary embodiments herein, in some applications it may be desired to spray the rings at a specific angle of inclination from the support blocks K so as to optimize the application of material to the targeted surface inside the rings. Since the two rings J will hit this angle at the same time, the rings are sprayed at the same time in the exemplary embodiment. If different angles of inclination can be used to spray the rings, then the rings for example may be sprayed at different times. The use of two guns for controlling spraying of the rings allows flexibility to the designer as to when the moving rings are sprayed.

The use of a material application apparatus 10 not only eliminates the need for an operator to manually apply lubricant material to the blanks and rings (it should be noted that the terms "non-manual" or "automatic" application does not preclude manual triggering of the spray guns, but rather only refers to eliminating manual application of material to the target surfaces such as with a brush), but also improves the uniformity and consistency of material applied. Since the rings can be automatically sprayed while in motion, there also is no need to stop the molding machine during its normal operation. In the exemplary embodiment, the material application apparatus also may be installed on an existing, operational machine as a retrofit, without having to make any significant modifications of the molding machine. Further, since material is only sprayed on the blanks and rings about every twenty minutes or so, the apparatus 10 can be serviced and even replaced without shutting down or otherwise interrupting normal operation of the molding machine.

Figure 6:
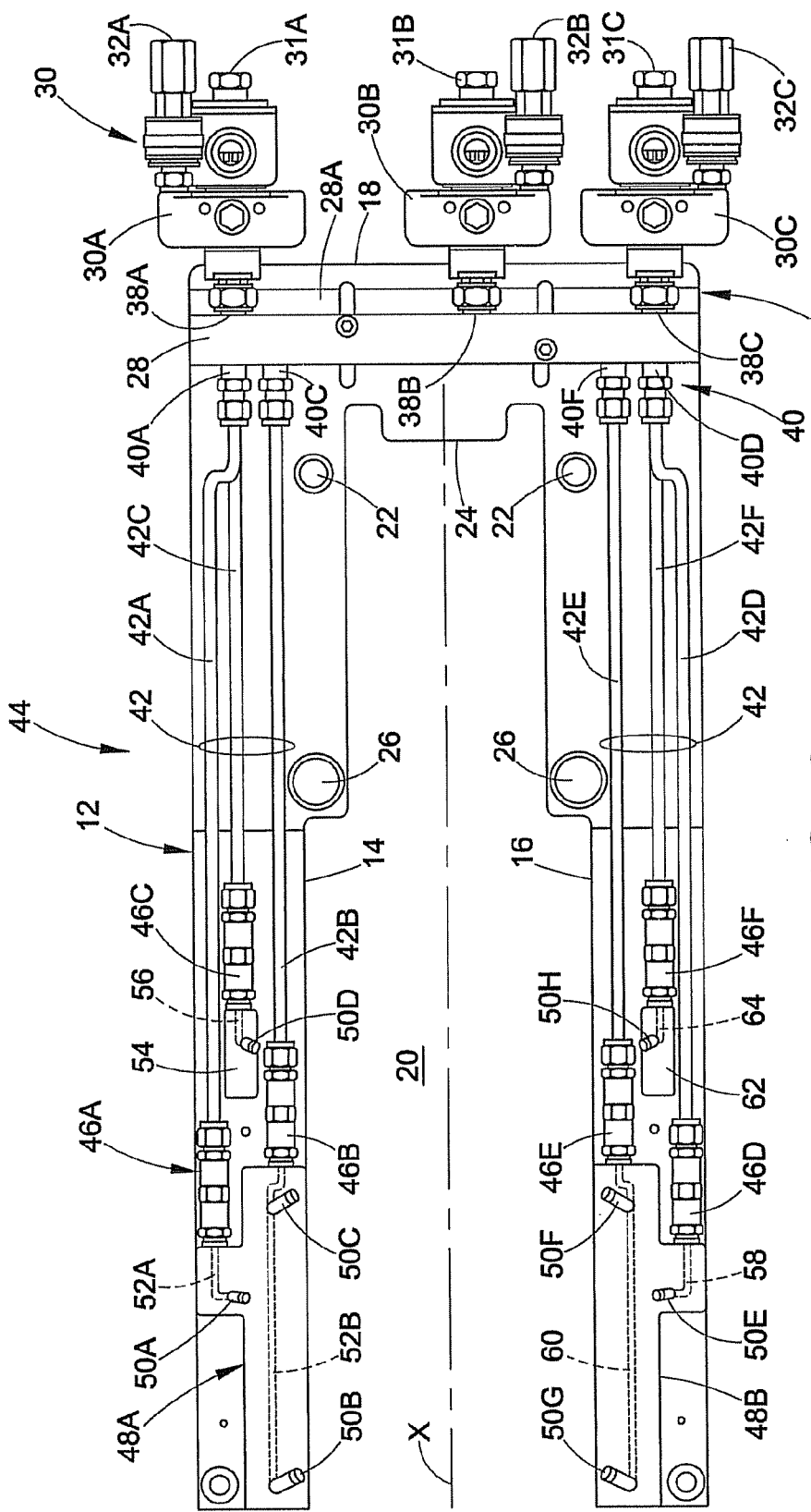
FIG. 6 is a plan view of the assembly of FIG. 5.

With reference next to FIGS. 5, 5A and 6, an embodiment of a material application apparatus 10 includes a generally flat frame or mounting plate 12 that is formed generally in the shape of a U, with two legs 14, 16 extending generally transversely from an end portion 18. The mounting plate 12 is preferably but need not be a unitary member. The U-shape configuration provides a central extended space 20 that allows for the apparatus 10 to be slideably positioned around and under the saddle (FIGS. 1-3) so that the legs 14, 16 extend to a region below the blanks and rings. In this manner the apparatus 10 may be easily installed and removed from an existing machine. Alternatively, of course, the apparatus 10 may be incorporated or integrated into a mold machine design. The legs 14, 16 may be provided with bolts 22 that allow the apparatus 10 to be anchored to a base (not shown) that the mold machine A rests on. The apparatus 10 when installed has a forward edge 24 of the end portion 18 abutting a back side of the saddle as a positioning and alignment aid if needed. The legs 14, 16 may also be provided with standoffs 26 to provide mechanical support for the legs since they are cantilevered in this embodiment.

The U-shape configuration may be modified to any shape or profile that is needed to adapt the apparatus 10 for a particular use. Additionally, although the exemplary embodiment illustrates three spray guns and eight nozzles, these numbers are exemplary. The inventions may be used with any number of nozzles and guns as needed for a particular application. Still further, although the exemplary embodiments illustrate spraying from nozzle orifices that are positioned below and to a side of each target surface, the apparatus 10 may easily be modified for spraying level with or from above the target surfaces, or a combination of multiple directions and orientations. Still as another alternative, the blanks and rings may also be individually sprayed from different orientations and locations of the nozzles and their respective orifices.

With continued reference to FIGS. 5, 5A and 6, a supply manifold 28 may be used as an interface between the spray guns and the nozzles, since one gun may serve a plurality of nozzles. In this example, the supply manifold 28 is disposed on the end portion 18 of the mounting plate 12. One or more spray guns 30 are mounted on an outside face 28a of the supply manifold 28. In this manner, as best illustrated in FIGS. 1-3, the spray guns 30 are positioned behind the molding machine for easier access for servicing and maintenance, and also thus positioned somewhat away and protected from the hot molten glass on the other side of the saddle. In this embodiment, there are three spray guns 30A, 30B and 30C. Each gun has a respective material inlet connection 32, such as a quick-connect, to a supply of the material to be applied. Material may be supplied under pressure from any suitable pump 34 (FIG. 4) through respective supply hoses 36 (FIG. 4). Typical input pressures to the spray guns 30 might be in the range of about 800 psi but will be selected based on the particular application. A suitable but not exclusive pump supply 34 is a pump model 25B pumping system available from Nordson Corporation, Westlake, Ohio.

The spray guns 30 may be mounted to respective input ports 38 of the supply manifold 28 by any convenient mechanism as needed. The supply manifold 28 includes internal flow passages that connect the input ports to selected ones of output ports 40, which are coupled in fluid communication with a number of nozzles 50. In this example, there are eight nozzles 50 supported on the legs 14, 16. Input port 38B which is connected to blanks spray gun 30B (the middle gun as viewed in the drawings), is connected by internal passages in the supply manifold 28 to outputs 40C and 40F. This gun is used to supply the four nozzles that spray the blanks. Input port 38A which is connected to a first rings spray gun 30A, is connected by internal passages to outputs 40A and 40D. This gun is used to supply two of the nozzles that spray two of the ring halves. Input port 38C which is connected to the second rings spray gun 30C, is connected by internal passages to outputs 40B and 40E. This gun is used to supply two of the nozzles that spray the other two of the ring halves.

The type of spray gun 30 selected will depend on the overall system design and spraying requirements. An exemplary spray gun is model A20A available from Nordson Corporation, Westlake, Ohio. This type gun is electrically controllable by input signals supplied to electrical inputs 31. In this embodiment, the molding machine controller 33 (FIG. 5) generates appropriate control signals to the spray guns when the guns are to be turned on and off, in accordance with the spray gun specifications. Alternative control techniques may be used. For example, it is possible that in some systems a manually controlled actuation signal may be supplied to the guns, although this would be less useful for spraying moving rings. Also, proximity sensors and timing circuits may be used to sense when the spray times should begin and end.

The supply manifold 28 output ports 40 are connected with tubing sections 42 respectively. The tubing sections 42 respectively extend out to the nozzle region 44 of the apparatus 10. The tubing may be, for example, stainless steel tubing with appropriate end connections as needed. Each tubing run is connected at a distal end to the input end of a check valve 46. In the exemplary embodiment, there are four nozzles on each leg 14, 16 with three tubing runs that supply material to the nozzles. Two of the nozzles have a common source and each of the other two nozzles have an independent source of material. For example, a first tubing section 42A connects outlet 40A to the inlet of a first check valve 46A. The first check valve 46A outlet communicates with an inlet to a first nozzle manifold block 48A. A first nozzle 50A is disposed on the nozzle manifold 50A and sprays material that is received through the associated check valve 46A via an internal passage 52A in the first nozzle manifold 48A. Second and third nozzles 50B and 50C may also be mounted on the first nozzle manifold 48A and share a common internal passage 52B that connects the nozzles in fluid communication with a second check valve 46B. The second check valve 46B has an output connected to a second input of the first nozzle manifold 48A and has an input connected to a second tubing run 42B that is connected to outlet 40C of the supply manifold 28. The outlet 40C receives material from the blanks spray gun 30B. A fourth nozzle 50D is disposed on a first nozzle block 54. A third tubing run 42C connects an outlet 40B (FIG. 5) from the supply manifold 28 to an inlet of a third check valve 46C. The outlet of the third check valve is connected to an inlet of the first nozzle block 54 which in turn is in fluid communication with the fourth nozzle 50D via internal passage 56 in the first nozzle block 54.

Two separate nozzle mounting arrangements (nozzle manifold 48A and nozzle block 54) are used because it is desirable in some cases, as in the exemplary embodiments, to control separate supplies of material to different nozzles. This may be desirable, for example, so that the ring spraying nozzles may be used to spray the rings at different times from each other and from when the blanks are sprayed. But in other designs, still further separate spraying times may be desired for each nozzle, or in some designs all the nozzles may spray at the same time and therefore could share a single common supply of material.

The other leg 16 of the apparatus 10 comprises similar structure, although such need not be the case in all designs. Thus, a fourth tubing run 42D provides a material flow path from a fourth outlet 40D to an input of a fourth check valve 46D, with the fourth check valve having an outlet connected to an inlet of a second nozzle manifold 48B, in turn connected in fluid communication to a fifth nozzle 50E via an internal passage 58. A fifth tubing run 42E provides a material flow path from a fifth outlet 40F to an input of a fifth check valve 46E, with the fifth check valve having an outlet connected to a second inlet of the second nozzle manifold 48B, in turn connected in fluid communication to a sixth nozzle 50F and a seventh nozzle 50G via a common internal passage 60. An eighth nozzle 50H is disposed on a second nozzle block 62. A sixth tubing run 42F connects an outlet 40E (FIG. 5) from the supply manifold 28 to an inlet of a sixth check valve 46F. The outlet of the sixth check valve is connected to an inlet of the second nozzle block 62 which in turn is in fluid communication with the eighth nozzle 50H via internal passage 64 in the second nozzle block 62.

Overall, the number of nozzles 50, nozzle manifolds 48, and nozzle blocks 54,62, as well as the number of check valves 46 and supply manifold outlets 40 and spray guns 30, will largely be a matter of overall design choice and spraying needs. The check valves 46 may be optional in some system designs depending on the nature of the spray pattern desired and the operational features of the spray guns 30.

As best illustrated in FIGS. 2, 5, 5A and 6, the various nozzles 50 are angled and aimed as appropriately needed to direct a spray or jet of material towards a selected target surface of one of the mold pieces. Since the blank halves, when open for spraying, are supported on either side of the axis X, the blank spray nozzles are aimed across the axis X and will crisscross each other relative to the axis X but do not hit each other. The crisscross spray directions for the blanks E and F are shown schematically in FIG. 2. Lines 51 represent spray directions from the four nozzles 50 that each spray a blank by spraying across to the opposite side, or in other words, across the X axis. Thus, nozzles 50B and 50C are aimed to spray respective blank halves that are positioned on the lower side of the central axis X (as viewed in FIG. 6), and nozzles 50F and 50G are aimed to spray respective blank halves on the upper side of the axis X (as viewed in FIG. 6). For spraying the rings, the ring spray nozzles 50A and 50D spray interior portions of the two ring halves that are opposite the axis X from those nozzles, and ring spray nozzles 50E and 50H spray interior portions of the two ring halves that are opposite the axis X from those nozzles.

Although in the exemplary embodiments herein the spray patterns are directed across the X axis in a crisscross manner, such is not required. For example, any one or more nozzles may spray to a target area that is on the same side of the X axis as the nozzle lies. This alternative is schematically represented by the dashed lines 53 in FIG. 2. The spray directions may thus be determined as a matter of design convenience to optimize the application of material to the target surfaces.

The rings are sprayed while in motion, and in the exemplary embodiment each ring is sprayed when it is at an angle θ, for example, of about 17° above horizontal (see FIG. 3). Since the two rings reach this angle at the same time, associated pairs of the ring spray nozzles (pair 50A and 50E, and pair 50D and 5011) spray at the same time. But alternatively, the nozzles may spray at different times simply by changing the timing signals to the spray guns 30. The use of two spray guns 30 for the rings allows for this added flexibility in spraying the ring portions at different times. Similarly, additional spray guns may be used for spraying different blanks at different times. In the case of the rings, using two guns (for the situation of having two rings to spray) allows for faster response times between the gun signal from the molding machine controller and creating the spray pattern. The response time (response time referring to the delay between sending a gun on signal from the molding machine controller to the time when the spray pattern is produced from the nozzles 50) is affected in part by pressure drops from the spray gun to the nozzle tips. Therefore, using two guns reduces the effect of this pressure drop on response time, which is helpful since the time window for spraying the rings may be in the millisecond range. In contrast, since the blanks stay stationary for a longer period of time, response time due to pressure drops between the gun and nozzles is not as significant a design criteria.

Relative to the spray guns, the blank spray gun 30B provides material to all four nozzles 50B, C, F, G and all four spray at the same time. First ring spray gun 30A provides material to ring spray nozzle pair 50A and 50E, and the second ring spray gun 30C provides material to ring spray nozzle pair 50D and 50H. Since associated nozzles for each ring are supplied by the same gun, they can spray at a time that is different from the other pair of ring spray nozzles. If needed, all nozzles can have a dedicated gun for total independent spray time control.

The check valves 46 may be but need not be all the same. In the exemplary embodiment, the check valves 46 have a cracking pressure of about 450 psi, but this value may be selected as needed. By having a high cracking pressure, the check valves assure that there is a significant pressure build up of the material close to the associated nozzles, so that when the associated spray gun is triggered, the spray pattern is created very quickly and cleanly with well defined edges and boundaries. Likewise, when the spray gun is turned off, the check valves 46 close quickly. The check valves 46 therefore help to provide a sharp and well defined spray pattern that does not exhibit spray pattern variation and drip. The check valves 46 help compensate for what would otherwise be pressure drops between the guns 30 and the nozzles 50. Thus it is preferred that the check valves be positioned close to the nozzles 50, so that the distance back to the guns is not critical. This distance to the guns allows the guns 30 to be positioned behind the saddle of the molding machine for easy maintenance and replacement access and safer access for the operator from the molten glass.

FIG. 7 illustrates schematically the hydraulic pressures for the exemplary embodiment, wherein the supply pump and regulator system 70 (including, for example, the pump 34 of FIG. 4) takes material from a supply 72 and provides the material at a pressure of about 800 psi to the spray guns 30 inlets. There is about a 100 psi pressure loss to the check valves in the exemplary embodiment, so the nozzles 50 are provided material at about 700 psi. When the guns 30 are off and the check valves closed, the system pressure at the inlets to the check valves is about 450 psi. The selected operating pressures will vary depending on overall system design criteria. In the exemplary embodiments, higher pressures are used at the nozzles to produce well defined and narrow spray patterns because the target areas are rather small and the nozzles must direct the spray pattern across distances of 10 inches or more to the surfaces being sprayed. Exemplary pressure ranges for the exemplary embodiment may be on the order of at least 500 psi at the nozzles 50. However, if check valves with lower cracking pressures are used, then the nozzle pressure may be lower.

Figure 8:
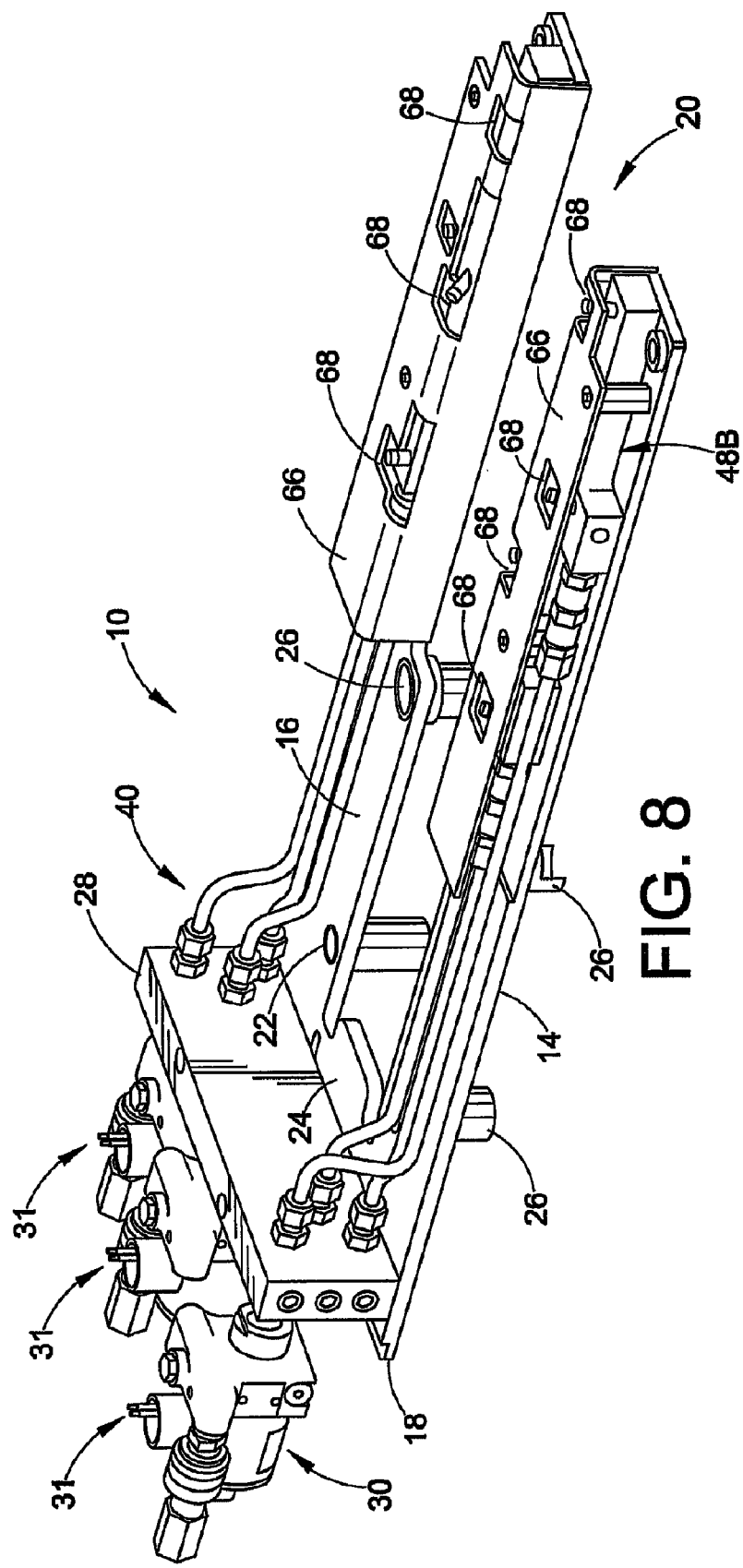
FIG. 8 is an isometric of a second embodiment of a gun and nozzle assembly.

FIG. 8 is similar in all respects to FIG. 5 except also shows that covers 66 may be used to help protect the nozzles 50. The covers 66 are installed on the mounting plate 18 with appropriate screws or other means and have openings 68 that allow the nozzles to direct spray patterns towards the mold pieces.

In the exemplary embodiment, and with reference to FIGS. 9A, 9B and 9C, each nozzle 50 includes a tube 74 that may be welded or otherwise secured to its respective nozzle manifold or nozzle block so as to be in fluid communication with the internal passage to receive material. The distal end of the tube 74 is provided with a nozzle tip and nozzle tip holder assembly 76. Alternatively, the nozzle tips 86 (FIGS. 9B and 9C embodiments) may be recessed in counterbores formed at appropriate angles in the respective nozzle manifolds and nozzle blocks so that the nozzle tips 86 may be recessed and protected. As illustrated in FIG. 9A, the nozzles may be designed to produce a tight, narrow conical spray pattern 78. The narrow well-defined pattern minimizes material overspray and waste, and also helps assure consistent and repeatable application of material to the targeted surfaces. In a typical system, the nozzles 50 may spray the blanks over a distance of about twelve to fifteen inches, and spray the rings over a distance of about five to seven inches. These distances however are exemplary as they will vary based on machine design. For example, an exemplary range may be about five to about eighteen inches or more.

The conical pattern also eliminates any need for nozzle orientation. The conical shape is not hollow but contains material distributed throughout the pattern 78, and is well suited for spraying the curved interior surfaces of the blanks and rings, but for other applications different spray pattern profiles may be used as needed. In one example, a 1.5 inch pattern may be sprayed at a distance of fifteen inches from the nozzle tip with a gun time of less than 70 milliseconds. In another example, a spray pattern of about one to three inches is produced for water sprayed at 500 psi to a target ten inches away from the nozzle and at a flow rate of about 0.03 to about 0.2 gallons per minute. The tight focused pattern is also facilitated by the high pressure input of the material to the nozzle tip, which also allows the spray pattern to be directed across distances as great as fifteen inches or more from the nozzle tip to the target surface. In further combination with the high pressure check valves, a sharp clean non-drip spray pattern is quickly generated to minimize wasted material and overspray. The spray patterns in the exemplary embodiment can be thought of as a jetting action due to the narrow tight spray pattern and short spray times of around 70 milliseconds or less. The flow rates, pressures, nozzle orifice size and shape and check valve design will all be interrelated and design criteria for each system, based further on the type of material being applied (such as its viscosity, for example), the distances between the nozzles and the target areas, and the tightness of the spray pattern needed (for example, to reduce overspray).

As illustrated in the embodiment of FIG. 9B, each nozzle 50 comprises a tube section 74 having a first end 80 that is connected to the nozzle manifold or block as the case may be. This connection may be welded or brazed, for example, or joined by any other suitable process. A nozzle tip holder 82 is inserted in the spray end of the tube 74. The tip holder 82 may also be welded, threaded or otherwise attached to the tube 74. The tip holder 82 includes a recessed pocket 84 that receives and retains a nozzle tip 86. The tip 86 includes one or more orifices 88 through which pressurized material flows from a tapered slot 90 to produce a spray pattern, such as for example the tight conical pattern exemplified in FIG. 9A. The nozzle holder and tip are available from Nordson Corporation, Westlake, Ohio. Other spray patterns and nozzle tip and tip holder designs however may be used as needed for particular spraying applications. In the embodiment of FIG. 9C, a tip holder 92 may include an end 94 that is press fit into the end of the tube 74, with a compressible seal ring 96 carried on the tip holder 92 body. The ring 96 is captured within the tube end 74 to secure the nozzle tip holder 92 in the tube 74.

The spray gun and nozzle assembly 10 is quite flexible in that it may easily be modified to include different numbers of nozzles, guns and check valves, and the orientation or spraying directions of the nozzles can be easily changed as needed. For example, a simple tool may be used to bend the nozzles at different angles or to optimize their angle based on test runs of the apparatus with particular molding machines. This allows a designer to construct an arrangement that can spray different numbers of mold pieces including more than two mold bodies (i.e. more than eight mold pieces as in the exemplary embodiment) and to adjust for different spatial positioning of the blanks and rings during spraying. The exemplary design allows for easy and fast installation and removal of the apparatus 10 without modification of the existing molding machine. While the U-shape mounting plate 18 is particularly well-suited for the type of molding machine illustrated herein, the shape and configuration of the apparatus 10 may be designed based on the particular molding machine that it is intended to interface with, and could be integrated with the molding machine as another alternative.

The inventions have been described with reference to the exemplary embodiments. Modifications and alterations will readily occur to others upon a reading and understanding of this specification and drawings. It is intended to include all such modifications and alterations insofar as they come within the scope of the appended claims or the equivalents thereof.

The invention claimed is:

1. An apparatus installable on a preexisting glass mold machine for applying a lubricant material to a mold body for a glass mold that opens and closes during a glass molding operation comprising:
    a frame supported on the machine;
    a manifold mounted on said frame having a plurality of material flow paths, each of said flow paths having an inlet into said manifold and an outlet from said manifold;
    a plurality of spray guns, each of said spray guns having a material inlet connected to a supply of lubricant material and a material outlet connected to one of said inlets to said manifold;
    a plurality of tubing sections, each of said tubing sections connected to one of said outlets of said manifold; and
    a plurality of nozzles supported on said frame, each of said nozzles connected to one of said tubing sections, wherein each of said spray guns supplies lubricant material under pressure to one or more of said nozzles to be sprayed from said nozzles onto the mold body and wherein each of said spray guns is turned on and off by input signals from a controller,
    said frame comprising a first leg and a second leg extending away from said manifold, said first leg supporting at least one tubing section and at least one nozzle connected to said tubing section, and said second leg supporting at least one tubing section and at least one nozzle connected to said tubing section.

2. The apparatus of claim 1 wherein said first and second legs are parallel each other with a space therebetween.

3. The apparatus of claim 2 wherein said first leg and second leg extend from an end of said frame so that said frame has a U-shape when viewed in plan.

4. The apparatus of claim 1 comprising a check valve disposed along a material flow path that extends between said manifold and one of said nozzles.

5. The apparatus of claim 4 wherein said check valve operates to maintain a minimum pressure in said material flow path.

6. The apparatus of claim 5 wherein said check valve is disposed closer to said nozzle than said check valve is disposed to said manifold.

7. The apparatus of claim 1 comprising a first spray gun that supplies material under pressure to a first set of one or more nozzles and a second spray gun that supplies material under pressure to a second set of one or more nozzles.

8. The apparatus of claim 1 wherein first and second nozzles produce respective first and second spray patterns in different directions with respect to each other.

9. An apparatus installable on a preexisting glass mold machine for applying a lubricant material to a mold body for a glass mold that opens and closes during a glass molding operation comprising:
    a frame supported on the machine;
    a manifold mounted on said frame having a plurality of material flow paths, each of said flow paths having an inlet into said manifold and an outlet from said manifold;
    a plurality of spray guns, each of said spray guns having a material inlet connected to a supply of lubricant material and a material outlet connected to one of said inlets to said manifold;
    a plurality of tubing sections, each of said tubing sections connected to one of said outlets of said manifold; and
    a plurality of nozzles supported on said frame, each of said nozzles connected to one of said tubing sections, wherein each of said spray guns supplies lubricant material under pressure to one or more of said nozzles to be sprayed from said nozzles onto the mold body and wherein each of said spray guns is turned on and off by input signals from a controller,
    a check valve disposed along a material flow path that extends between said manifold and one of said nozzles.

10. The apparatus of claim 9 wherein said frame comprises a first leg and a second leg extending away from said manifold.

11. The apparatus of claim 10 wherein said first leg and second leg are parallel each other with a space therebetween.

12. The apparatus of claim 11 wherein said first leg and second leg extend from an end of said frame so that said frame has a U-shape when viewed in plan.

13. The apparatus of claim 9 wherein said check valve operates to maintain a minimum pressure in said material flow path.

14. The apparatus of claim 9 wherein said check valve is disposed closer to said nozzle than said check valve is disposed to said manifold.

15. The apparatus of claim 9 comprising a first spray gun that supplies material under pressure to a first set of one or more nozzles and a second spray gun that supplies material under pressure to a second set of one or more nozzles.

16. The apparatus of claim 9 wherein first and second nozzles produce respective first and second spray patterns in different directions with respect to each other.

17. The apparatus of claim 9 wherein said check valve has an input connected to said manifold and an output connected to one of said nozzles.

18. The apparatus of claim 17 wherein said check valve is connected between one of said nozzles and one of said tubing sections.

19. The apparatus of claim 18 wherein a check valve is connected between each of said nozzles and one of said tubing sections.

* * * * *

UNITED STATES PATENT AND TRADEMARK OFFICE
CERTIFICATE OF CORRECTION

PATENT NO. : 8,186,181 B2
APPLICATION NO. : 12/729528
DATED : May 29, 2012
INVENTOR(S) : William E. Donges Page 1 of 1

It is certified that error appears in the above-identified patent and that said Letters Patent is hereby corrected as shown below:

Title Page, Item (75) Inventors: Please add the middle initial "A." to the second named inventor.
The second named inventor should read: Vincent A. Prieto Signed and Sealed this
Ninth Day of April, 2013

Teresa Stanek Rea
*Acting Director of the United States Patent and Trademark Office*